US007985355B2

(12) United States Patent
Luly et al.

(10) Patent No.: US 7,985,355 B2
(45) Date of Patent: Jul. 26, 2011

(54) COMPOSITIONS CONTAINING SULFUR HEXAFLUORIDE AND USES THEREOF

(75) Inventors: Matthew H. Luly, Hamburg, NY (US); Rajiv R. Singh, Getzville, NY (US); Robert G. Richard, Hamburg, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/728,371

(22) Filed: Mar. 22, 2010

(65) Prior Publication Data

US 2010/0171062 A1 Jul. 8, 2010

Related U.S. Application Data

(62) Division of application No. 11/871,729, filed on Oct. 12, 2007, now Pat. No. 7,736,529.

(51) Int. Cl.
*H01B 3/16* (2006.01)
*H01G 4/02* (2006.01)

(52) U.S. Cl. ............ 252/571; 252/574; 252/67; 252/68; 252/69; 252/364; 252/2; 361/2; 361/326

(58) Field of Classification Search .................. 252/571, 252/574, 67, 68, 69, 364, 2; 361/2, 326; 428/36.5

See application file for complete search history.

(56) References Cited

U.S. PATENT DOCUMENTS

| | | | | |
|---|---|---|---|---|
| 4,071,461 | A | 1/1978 | Mears et al. | |
| 5,840,193 | A | 11/1998 | Smart et al. | |
| 6,254,789 | B1 | 7/2001 | Marion et al. | |
| 6,649,062 | B1 | 11/2003 | Petty | |
| 6,905,630 | B2 * | 6/2005 | Klug et al. | 252/67 |
| 7,045,556 | B2 | 5/2006 | Handa et al. | |
| 7,097,715 | B1 | 8/2006 | Racette et al. | |
| 7,736,529 | B2 * | 6/2010 | Luly et al. | 252/67 |
| 2003/0129118 | A1 | 7/2003 | Miller | |
| 2004/0110028 | A1 | 6/2004 | Irvin et al. | |
| 2004/0144399 | A1 | 7/2004 | McDermott et al. | |
| 2005/0016829 | A1 | 1/2005 | Miller et al. | |
| 2005/0065385 | A1 | 3/2005 | Kaga et al. | |
| 2007/0213416 | A1 | 9/2007 | Handa et al. | |
| 2008/0004194 | A1 | 1/2008 | McDermott et al. | |
| 2008/0127427 | A1 | 6/2008 | Racette et al. | |
| 2008/0206874 | A1 | 8/2008 | Manka | |

OTHER PUBLICATIONS

M.C. Siddagangappa et al., "Prediction of Breakdown Voltages of Binary Gas Mixtures in Uniform Fields," IEEE Transactions on Electrical Insulation, vol. E1-19, No. 4, Aug. 1984, pp. 359-361.
Reg. No. 2551-62-4 (sulfur hexafluoride), Nov. 16, 1984.
Reg. No. 10024-97-2 (nitrous oxide), Nov. 16, 1984.
Sven Horstmann et al., "Experimental determination of critical data of mixtures and their relevance for the development of thermodynamic models," Chemical Engineering Science, vol. 56, 2001, pp. 6905-6913.

* cited by examiner

*Primary Examiner* — Douglas MC Ginty

(57) ABSTRACT

A method for suppressing an electric arc or corona discharge includes providing a device capable of storing, transmitting, or generating an electrical current or field; and enveloping at least a portion of said device with a dielectric gas consisting essentially of: sulfur hexafluoride; a second component selected from the group consisting of nitrous oxide; carbon dioxide; trifluoromethane (R32); trifluoroiodomethane; octafluoropropane (R218); 1,1,1,2,2-pentafluoroethane (R125); propane (R290); 1,1,1,2-tetrafluoropropene (HFO-1234yf); 1,2,3,3-tetrafluoro-2-propene (HFO-1234yc); 1,1,3,3-tetrafluoro-2-propene (HFO-1234zc); 1,1,1,3-tetrafluoro-2-propene (HFO-1234ze); 1,1,2,3-tetrafluoro-2-propene (HFO-1234ye); 1,1,1,2,3-pentafluoropropene (HFO-1225ye); 1,1,2,3,3-pentafluoropropene (HFO-1225yc); 1,1,1,3,3-pentafluoropropene (HFO-1225zc); (Z)1,1,1,3-tetrafluoropropene (HFO-1234zeZ); (Z)1,1,2,3-tetrafluoro-2-propene (HFO-1234yeZ); (E)1,1,1,3-tetrafluoropropene (HFO-1234zeE); (E)1,1,2,3-tetrafluoro-2-propene (HFO-1234yeE); (Z)1,1,1,2,3-pentafluoropropene (HFO-1225yeZ); (E)1,1,1,2,3-pentafluoropropene (HFO-1225yeE) and combinations of two or more of these; and optionally, an additive selected from the group consisting of stabilizers, metal passivators, corrosion inhibitors, and lubricants.

3 Claims, No Drawings

COMPOSITIONS CONTAINING SULFUR HEXAFLUORIDE AND USES THEREOF

RELATED APPLICATION

This application is a divisional of U.S. Ser. No. 11/871,729, filed Oct. 12, 2007 which issued as U.S. Pat. No. 7,736,529 on Jun. 15, 2010.

BACKGROUND

1. Field of Invention

The present invention relates to compositions containing sulfur hexafluoride, methods of using the same, and devices and articles of manufacture comprising the compositions.

2. Description of Related Art

Perfluorocarbon compounds (PFC's), hydrofluorocarbon compounds (HFC's), chlorofluorocarbons (CFC's), hydrochlorofluorocarbon compounds (HCFC's), and sulfur hexafluoride ($SF_6$) are widely used in a variety of industrial, commercial, consumer and public use applications and uses. However, several of these compounds have been identified as particularly problematic to the environment in that they contribute to the greenhouse gas effect, i.e., they have relatively high global warming potentials (GWP). For example, $SF_6$ possesses one of the highest GWP values of known compounds.

Due to its relatively high GWP, $SF_6$ is being phased out of several applications for which low-GWP substitutes are available. However, presently there is no adequate substitute for $SF_6$ when used as a gaseous dielectric medium in high voltage ($\geqq 1$ kV) applications, such as circuit breakers, switchgear, and other electrical equipment. In such devices, pressurized $SF_6$ is used as a gas-phase insulator because it has much higher dielectric strength compared to several other available compounds such as air or dry nitrogen. Although the electrical industry has taken steps to reduce the leak rates of $SF_6$ from high voltage equipment, monitor $SF_6$ usage, increase recycling of equipment utilizing $SF_6$, and generally reduce $SF_6$ emissions to the atmosphere, it would still be advantageous to find a $SF_6$ substitute for electrical applications utilizing a dielectric gas.

In addition to electrical applications, relatively low GWP substitutes for $SF_6$ are desirable for other applications such as refrigeration, closed cell foam production, propellants for sprayable compositions, magnesium cover gases, and the like. There is particularly a need for such new compositions that are essentially non-flammable, that do not have a deleterious effect on the atmosphere, that are chemically stable, and that have high dielectric strength. For example, new low GWP compositions designed for use as refrigerants or blowing agents should preferably have similar stability as existing refrigerants or blowing agents, be non-flammable, and have a normal boiling point within a reasonable range as existing refrigerants or blowing agents.

While a number of compositions have been proposed as suitable substitutes for high GPW compositions, compounds were heretofore unknown that have an acceptable combination of boiling point, chemical stability, low GWP, non-flammability, and acceptable performance as a refrigerant, blowing agent, and/or high-voltage dielectric gas. For example, carbon dioxide is a refrigerant that is stable and has a relatively low GWP, but the vapor pressure of this compound are significantly higher than most refrigerants now in use. This deficiency generates significant problems in attempting to implement its use in the refrigeration industry because existing refrigeration equipment would have to be extensively modified, redesigned, or replaced to utilize $CO_2$ as a refrigerant. Thus, there is still a significant need to develop a composition or mixture of compositions that have an acceptable combination of boiling point, chemical stability, low GWP, non-flammability and dielectric performance.

SUMMARY OF THE INVENTION

Applicants have found novel azeotrope-like mixtures of sulfur hexafluoride ($SF_6$) and nitrous oxide ($N_2O$). In addition to the unpredictable nature of azeotrope formation, these azeotrope-like compositions unexpectedly possess dielectric strengths that are not proportionate to their molar ratios. That is, the combination of sulfur hexafluoride and nitrous oxide in azeotrope-like amounts produces a synergistic effect with respect to the composition's dielectric strength. Applicants have also found that these compositions are essentially non-flammable (e.g., according to ASHRAE Standard 34 (2004)), have relatively low GWP, have good chemical stability, and have normal boiling points comparable to common refrigerants, foam blowing agents, and propellants for sprayable compositions. These azeotrope-like compositions are, therefore, ideally suited for applications that are flammable and/or can benefit from an electrically-insulating gas and that are subject to leaking of the composition into the ambient environment.

Applicants have also found that known azeotrope-like mixtures of $SF_6$ and a second component, such as carbon dioxide ($CO_2$), trifluoromethane (R23), trifluoroiodomethane ($CF_3I$), octafluoropropane (R218), 1,1,1,2,2-pentafluoroethane (R125), and propane (R290) also unexpectedly possess dielectric strength that is not proportionate to their molar ratios. These azeotrope-like compositions are also essentially non-flammable (e.g., according to ASHRAE Standard 34 (2004)), have relatively low GWP, have good chemical stability, and have normal boiling points comparable to common refrigerants, foam blowing agents, and propellants for sprayable compositions. Thus, these compositions are also ideally suited for applications that are flammable and/or can benefit from an electrically-insulating gas and that are subject to leaking of the composition into the ambient environment.

Applicants have further found that mixtures of $SF_6$ and certain hydrofluoroolefins, such as tetrafluoropropene and pentafluoropropene, produce a synergistic effect with respect to the composition's dielectric strength, are essentially non-flammable (e.g., according to ASHRAE Standard 34 (2004)), have relatively low GWP, have good chemical stability, and have normal boiling points comparable to common refrigerants, foam blowing agents, and propellants for sprayable compositions. Examples of suitable tetrafluoropropenes include 1,1,1,2-tetrafluoropropene (HFO-1234yf); 1,2,3,3-tetrafluoro-2-propene (HFO-1234yc); 1,1,3,3-tetrafluoro-2-propene (HFO-1234zc); 1,1,1,3-tetrafluoro-2-propene (HFO-1234ze); 1,1,2,3-tetrafluoro-2-propene (HFO-1234ye); and related stereoisomers such as (Z)1,1,1,3-tetrafluoropropene (HFO-1234zeZ); (Z)1,1,2,3-tetrafluoro-2-propene (HFO-1234yeZ); and (E)1,1,1,3-tetrafluoropropene (HFO-1234zeE). Suitable pentafluoropropenes include 1,1,1,2,3-pentafluoropropene (HFO-1225ye); 1,1,2,3,3-pentafluoropropene (HFO-1225yc); 1,1,1,3,3-pentafluoropropene (HFO-1225zc); and related stereoisomers such as (E)1,1,2,3-tetrafluoro-2-propene (HFO-1234yeE); (Z)1,1,1,2,3-pentafluoropropene (HFO-1225yeZ); and (E)1,1,1,2,3-pentafluoropropene (HFO-1225yeE). Thus, these compositions are also ideally suited for applications that are flammable and/or can benefit from an electrically-insulating gas and that are subject to leaking of the composition into the ambient environment.

Accordingly, provided is a binary azeotrope-like composition consisting essentially of $SF_6$, $N_2O$, and optionally, an additive selected from the group consisting of stabilizers, metal passivators, corrosion inhibitors, and lubricants.

Also provided is a method for suppressing an electrical arc or corona discharge comprising (a) providing a device capable of storing, transmitting, or generating an electrical current or field; and (b) enveloping at least a portion of said device with a dielectric gas, preferably as an azeotrope-like mixture, consisting essentially of $SF_6$; a second component selected from the group consisting of $N_2O$, $CO_2$, R32, $CF_3I$, R218, R125, R290, HFO-1234 isomers including HFO-1234yf, HFO-1234ze, HFO-1234zc, HFO-1234yc, HFO-1234ye, as well as stereoisomers thereof, HFO-1225 isomers including HFO-1225ye, HFO-1225yc, HFO-1225zc, as well as stereoisomers thereof, and combinations two or more of these; and optionally, an additive selected from the group consisting of stabilizers, metal passivators, corrosion inhibitors, and lubricants.

Further provided is a gas insulated electrical device comprising a device capable of generating, storing, and/or transmitting an electrical current or field, and a dielectric gas, preferably as an azeotrope-like mixture, consisting essentially of $SF_6$; a second component selected from the group consisting of $N_2O$, $CO_2$, R32, $CF_3I$, R218, R125, R290, HFO-1234 isomers including HFO-1234yf, HFO-1234ze, HFO-1234zc, HFO-1234yc, HFO-1234ye, as well as stereoisomers thereof, HFO-1225 isomers including HFO-1225ye, HFO-1225yc, HFO-1225zc, as well as stereoisomers thereof, and combinations two or more of these; wherein at least a portion of said device is enveloped by said dielectric gas.

Further provided is a method for flame suppression comprising (a) providing a contained environment comprising one or more flammable materials; and (b) introducing a fluid composition, preferably as an azeotrope-like mixture, into the environment, wherein the fluid composition consists essentially of $SF_6$; a second component selected from the group consisting of $N_2O$, $CO_2$, R32, $CF_3I$, R218, R125, R290, HFO-1234 isomers including HFO-1234yf, HFO-1234ze, HFO-1234zc, HFO-1234yc, HFO-1234ye, as well as stereoisomers thereof, HFO-1225 isomers including HFO-1225ye, HFO-1225yc, HFO-1225zc, as well as stereoisomers thereof, and combinations two or more of these; and optionally, an additive selected from the group consisting of stabilizers, metal passivators, corrosion inhibitors, and lubricants; wherein said gaseous mixture is present in an amount effective to reduce the flammability of said environment.

Still further provided is a rigid closed cell foam comprising a dielectric gas, preferably as an azeotrope-like mixture, consisting essentially of $SF_6$; a second component selected from the group consisting of $N_2O$, $CO_2$, R32, $CF_3I$, R218, R125, R290, HFO-1234 isomers including HFO-1234yf, HFO-1234ze, HFO-1234zc, HFO-1234yc, HFO-1234ye, as well as stereoisomers thereof, HFO-1225 isomers including HFO-1225ye, HFO-1225yc, HFO-1225zc, as well as stereoisomers thereof, and combinations two or more of these, wherein said dielectric gas is disposed within cells of said foam.

DESCRIPTION OF PREFERRED EMBODIMENTS

In certain preferred embodiments, provided are novel azeotrope-like compositions consisting essentially of $SF_6$ and $N_2O$.

As used herein, the term “azeotrope-like” is intended in its broad sense to include both compositions that are strictly azeotropic as well as compositions that generally behave like azeotropic mixtures. Fundamental thermodynamic principles define the state of a fluid by its pressure, temperature, liquid composition, and vapor composition. An azeotropic mixture is a system of two or more components in which the liquid composition and vapor composition are equal at the stated pressure and temperature. In practice, this means that the components of an azeotropic mixture are constant-boiling and generally cannot be separated during a phase change.

According to the present invention, the azeotrope-like compositions that consist essentially of two components are binary azeotrope-like compositions although such compositions may include additional components, provided that the additional components do not form new azeotrope-like systems (e.g., ternary azeotropes or azeotropes wherein one or more of the azeotropic components is other than the named components), and/or are not in a first distillation cut. The first distillation cut is the first cut taken after the distillation column displays steady state operation under total reflux conditions. One way to determine whether the addition of a component forms a new azeotrope-like system so as to be outside of this invention is to distill a sample of the composition with the component under conditions that would be expected to separate a non-azeotropic mixture into its separate components. If the mixture containing the additional component is non-azeotrope-like, the additional component will fractionate from the azeotrope-like components. If the mixture is azeotrope-like, some finite amount of a first distillation cut will be obtained that contains all of the mixture components that is constant boiling or behaves as a single substance.

Another characteristic generally possessed by azeotrope-like compositions is that there is a range of compositions containing the same components in varying proportions that are azeotrope-like or approximately constant boiling. All such compositions are intended to be covered by the terms “azeotrope-like” and “constant boiling”. As an example, it is well known that azeotropes possess the same vapor pressure at a given temperature for at least two different ratios of components (thus a deviation from Raoult’s law). Azeotrope-like compositions, by corollary, possess vapor pressures that vary only slightly at the same temperature for two or more ratios of components, but generally deviate significantly from the vapor pressure as predicted by Raoult’s law. All such compositions are intended to be covered by the term azeotrope-like as used herein.

It is well-recognized in the art that it is not possible to predict the formation of azeotropes. Applicants have discovered unexpectedly that sulfur hexafluoride forms azeotrope-like compositions when mixed $N_2O$.

Preferably, the $SF_6/N_2O$ azeotrope-like compositions consists essentially of from greater than about 0 to about 55 weight percent sulfur hexafluoride and from about 45 to less than about 100 weight percent nitrous oxide, more preferably from about 1 to about 54.9 weight percent sulfur hexafluoride and from about 45.1 to less than about 99 weight percent nitrous oxide, and even more preferably from about 33 to about 34 weight percent sulfur hexafluoride and from about 66 to less than about 67 weight percent nitrous oxide.

The azeotrope-like compositions of the present invention may further include any of a variety of optional additives including stabilizers, metal passivators, corrosion inhibitors, and the like, provided that the additive does not affect the binary azeotrope-like nature of the composition.

Any of a variety of compounds suitable for stabilizing a composition of the present invention may be used as a stabilizer. Examples of certain preferred stabilizers include stabilizer compositions comprising at least one phenol, compositions comprising at least one epoxide selected from the group consisting of aromatic epoxides, alkyl epoxides, alkenyl epoxides, and combinations of two or more of these composition.

Preferably, the amount of stabilizer present in the composition is an effective stabilizing amount. As used herein, the term "effective stabilizing amount" refers to an amount of stabilizer that when added to a composition, results in a composition that degrades (e.g., chemical, thermal, electrical, and/or radiation degradation) more slowly and/or to a lesser degree relative to the original composition, under the same or similar conditions. In certain preferred embodiments, an "effective stabilizing amount" of stabilizer comprises an amount which, when added to a composition results in a stabilized composition under the conditions of at least one, and preferably both, of the standards tests SAE J1662 (issued June 1993) and ASHRAE 97-1983R. Certain preferred effective amounts of stabilizer for use in the present invention include those present in an amount from about 0.001 to about 10, more preferably from about 0.01 to about 5, even more preferably from about 0.3 to about 4 weight percent, and even more preferably from about 0.3 to about 1 weight percent based on the total weight of the composition of the present invention.

In certain preferred embodiments, the compositions of the present invention further comprise a lubricant. Any type of conventional lubricant may be used in the present compositions, provided that they do not have an adverse effect on the application. For refrigeration systems, it is preferred that the composition comprise a lubricate that can be returned to the compressor of the system in an amount sufficient to lubricate the compressor. Thus, suitability of a lubricant for any given system is determined partly by the physical and chemical characteristics of the lubricant itself and partly by the characteristics of the system in which it is intended to be used. Examples of suitable lubricants, particularly for heat transfer systems, include mineral oil, alkyl benzenes, polyol esters, including polyalkylene glycols, PAG oil, and the like. Mineral oil, which comprises paraffin oil or naphthenic oil, is commercially available as, for example, Witco® LP 250 from Witco, Zerol® 300 from Shrieve Chemical, Sunisco® 3GS from Witco, and Calumet® RO15 from Calumet. Commercially available alkyl benzene lubricants include Zerol® 150. Commercially available esters include neopentyl glycol dipelargonate which is available as Emery® 2917 and Hatcol® 2370. Other useful esters include phosphate esters, dibasic acid esters, and fluoroesters. Preferred lubricants include polyalkylene glycols and esters. Certain more preferred lubricants include polyalkylene glycols.

In certain other embodiments of the invention, provided is a method for suppressing an electric arc or corona discharge comprising the steps of (a) providing a device capable of storing, transmitting, or generating an electrical current or field; and (b) enveloping at least a portion of said device with a dielectric gas comprising (i) a novel $SF_6/N_2O$ azeotrope-like composition as described herein, (ii) a known azeotrope-like mixture consisting essentially of $SF_6$ and a second component, such as a compound selected from the group consisting of $CO_2$, R32, $CF_3I$, R218, R125, and R290, or (iii) a mixture of $SF_6$ and a hydrofluoroolefin, such as HFO-1225yeZ, HFO-1234yf, HFO-1234ze, and stereo-isomers thereof.

As used herein, the term "electric arc" means an undesired or unintended electrical breakdown of gas which produces an ongoing or momentary plasma discharge or other electrostatic discharge, whereas the term "corona discharge" means the ionization of a fluid surrounding a conductor which occurs when the strength of the electric field exceeds a minimum threshold, but under conditions insufficient to cause complete electrical breakdown. Arc and corona discharges can be mitigated via the presence of a dielectric medium because when two electric charges move through a dielectric medium, the interaction energies and forces between them are reduced.

$SF_6$ is used by the electrical industry as a pressurized gaseous dielectric medium for high-voltage (e.g., about 1 kV or greater) circuit breakers, switchgear, and other electrical equipment. However, according to the Intergovernmental Panel on Climate Change, $SF_6$ is the most potent greenhouse gas that it has evaluated, with a global warming potential of 22,200 times that of $CO_2$ over a 100 year period. Thus the leakage of $SF_6$ from the electrical device into the atmosphere is undesirable. The presence of $N_2O$, $CO_2$, R32, $CF_3I$, R218, R125, R290, an isomer of HFO-1225, or an isomer of HFO-1234 in the $SF_6$ compositions mitigates this effect by proportionately reducing the overall GWP of the composition—i.e., a portion of the relatively high GWP $SF_6$ is substituted with a relatively lower GWP compound.

It is expected that the presence of $SF_6$ proportionately increases the dielectric strength of the overall composition based upon the molar concentration of the $SF_6$. However, the $SF_6$ compositions described herein have a synergistic effect in that their combination produces unexpectedly high dielectric strength. That is, blending $SF_6$ with $N_2O$, $CO_2$, R32, $CF_3I$, R218, R125, R290, HFO-1234 isomers including HFO-1234yf, HFO-1234ze, HFO-1234zc, HFO-1234yc, HFO-1234ye, as well as stereoisomers thereof, HFO-1225 isomers including HFO-1225ye, HFO-1225yc, HFO-1225zc, preferably at concentrations necessary to form an azeotrope-like mixture, produces a synergistic effect with respect to the composition's dielectric strength.

For compositions having two or more components, the term "synergistic effect" means a property or quality of a composition achieved via the co-action of the components in combination which would not be achieved merely from the proportionate amount of the individual components alone. For example, the dielectric strength of the compositions of the present invention is higher than would be expected based upon the molar concentrations of the individual components in the composition.

Accordingly, the $SF_6$ compositions described herein can be used to advantageously reduce global warming while providing a high dielectric medium for suppressing electric arcs and corona discharges. In preferred embodiments of this method, the dielectric gas are azeotrope-like in nature. Azeotrope-like compositions are preferred in some applications because the dielectric gas inadvertently or unintentionally lost from an electrical system will have a compositional ratio similar to the original composition. Thus, the loss of dielectric gas does not significantly change the relative concentration of components remaining in the system thereby maintain the system's chemical and physical properties.

Particularly preferred dielectric gases for this method include: a dielectric gas consisting essentially of from greater than about 0 to about 55 weight percent sulfur hexafluoride and from about 45 to less than about 100 weight percent nitrous oxide; a dielectric gas consisting essentially of from greater than about 0 to about 43 weight percent sulfur hexafluoride and from about 57 to less than about 100 weight percent carbon dioxide; a dielectric gas consisting essentially of from greater than about 0 to about 53 weight percent sulfur hexafluoride and from about 47 to less than about 100 weight percent trifluoromethane; and a dielectric gas consisting essentially of from greater than about 0 to about 64 weight percent sulfur hexafluoride and from about 36 to less than about 100 weight percent octafluoropropane.

In certain other embodiments of the invention, provided is a gas insulated electrical device comprising one or more components capable of generating, storing, and/or transmitting an electrical current and/or field, and a dielectric gas consisting essentially of $SF_6$ and a second component selected from the group consisting of $N_2O$, $CO_2$, R32, $CF_3I$, R218, R125, R290, HFO-1234 isomers including HFO-1234yf, HFO-1234ze, HFO-1234zc, HFO-1234yc, HFO-1234ye, as well as stereoisomers thereof, HFO-1225 isomers including HFO-1225ye, HFO-1225yc, HFO-1225zc, as well as stereoisomers thereof, and combinations two or more of these; wherein at least a portion of said one or more components is enveloped by said dielectric gas. Due to its high dielectric strength, the dielectric gas is highly resistant to the flow of electrical current and, thus, can serve as an electrical insulator. Preferably, the dielectric gas of this embodiment has a much higher dielectric strength than air or dry nitrogen. This property makes it possible to significantly reduce the size of an electrical device (compared to devices using air or nitrogen as a gas insulator) because a smaller volume of the SF6 dielectric gas provides the same insulative capacity as a larger void of air or nitrogen.

Preferably, the $SF_6$ and said second component are present in said dielectric gas in amounts sufficient to form an azeotrope-like composition.

In preferred embodiments, the one or more electrical components comprise a high voltage (i.e., ≧about 1 kV) electrical network and/or circuit. Particularly preferred components include resistors, inductors, capacitors, transformers, transistors, inductors, rectifiers, transmission lines, motors, generators, voltage sources, circuit breakers, and electrical switchgears.

In certain embodiments, the invention provides a method for flame suppression comprising (a) providing a contained environment having, or adapted to receive, one or more flammable materials; and (b) introducing into at least a portion of said environment a fluid composition, preferably as an azeotrope-like mixture, consisting essentially of $SF_6$; a second component selected from the group consisting of $N_2O$, $CO_2$, R32, $CF_3I$, R218, R125, R290, HFO-1234 isomers including HFO-1234yf, HFO-1234ze, HFO-1234zc, HFO-1234yc, HFO-1234ye, as well as stereoisomers thereof, HFO-1225 isomers including HFO-1225ye, HFO-1225yc, HFO-1225zc, as well as stereoisomers thereof, and combinations two or more of these; and optionally, one or more additives selected from the group consisting of stabilizers, metal passivators, corrosion inhibitors, and lubricants; wherein said gaseous mixture is present in an amount effective to reduce the flammability of said environment.

The fluid composition, and the contents of the nonflammable environment having the fluid composition, are preferably nonflammable according to ASHRAE Standard 34 (2004) and/or other standards. Flame suppression is achieved by the fluid, in part, from the physical and chemical properties of $SF_6$, including its relatively high heat capacity, reactive inertness (e.g., low oxidation potential), and its ability to displace other, more oxidizable gases from the closed environment. Since the compositions have a relatively low GWP which is desirable in several application, particularly applications from which the fluid is susceptible to leaking into the ambient environment. Moreover, the fluids have normal boiling points that are comparable to the boiling points of several common refrigerants and, thus, can be used as a low-GWP, nonflammable refrigerant substitutes for known refrigerants that are either flammable or have a relatively higher GWP. Such fluids can also ideally be used as a cover gas in the production of non-ferrous metal, such as magnesium.

In certain other embodiments, provided is a rigid closed cell foam comprising a dielectric gas, preferably as an azeotrope-like mixture, consisting essentially of $SF_6$; a second component selected from the group consisting of $N_2O$, $CO_2$, R32, $CF_3I$, R218, R125, R290, HFO-1234 isomers including HFO-1234yf, HFO-1234ze, HFO-1234zc, HFO-1234yc, HFO-1234ye, as well as stereoisomers thereof, HFO-1225 isomers including HFO-1225ye, HFO-1225yc, HFO-1225zc, as well as stereoisomers thereof, and combinations two or more of these, wherein said dielectric gas is disposed within cells of the foam. Such closed cell foams can be produced from known polyol premixes, but using the dielectric gas as a blowing agent. Advantageously, these dielectric gases have normal boiling points comparable to common blowing agents. In addition to a high thermal insulative value, the resulting foams also are highly electrically insulative.

EXAMPLES

The invention is illustrated by, but not limited to, the following examples which are intended to be illustrative, but not limiting in any manner.

Example 1

Two vessels, each having a pressure gage and a platinum resistance thermometer are disposed in an isothermic environment (i.e., a water bath) at 2.0° C. The first vessel is charged with about 16 g nitrous oxide and the second vessel is charged with $SF_6$. The $SF_6$ is added in small, measured increments from the second vessel to the first vessel while recording the first vessel's pressure. No significant pressure change (i.e., pressure change is within about 1 psi of starting pressure) is observed when $SF_6$ is added to nitrous oxide, from greater than about 0 to about 56 weight percent $SF_6$ indicating a binary minimum boiling azeotrope-like composition formed. The properties of binary mixtures are shown in Table 1.

The pressure of the blend did not drop with the addition of the sulfur hexafluoride. It would be expected to drop since sulfur hexafluoride has a lower vapor pressure than nitrous oxide. This demonstrates a constant boiling mixture and azeotrope-like behavior of the composition over this range.

TABLE 1

SF6/nitrous oxide compositions at 2.0° C.

| SF6 liquid phase (mole fraction) | Pressure (psia) | Raoult's law (psia) | excess pressure (psi) |
|---|---|---|---|
| 0.000 | 477.6 | 477.6 | 0.0 |
| 0.005 | 477.6 | 476.1 | 1.5 |
| 0.011 | 476.6 | 474.4 | 2.1 |
| 0.016 | 477.6 | 473.1 | 4.5 |
| 0.028 | 477.6 | 469.7 | 7.9 |
| 0.036 | 477.6 | 467.4 | 10.2 |
| 1.000 | 197.8 | 197.8 | 0.0 |

Prophetic Example

An ASTM-E681 apparatus can be used to measure the flammability of the mixtures of sulfur hexafluoride and nitrous oxide. The procedure described in the ASHRAE-34 can be used to judge the flammability of the mixtures at 60° C. and at 100° C. Accordingly it will be found that at about 60° C. and at about 100° C., the blend is nonflammable.

Having thus described a few particular embodiments of the invention, it will be apparent to those skilled in the art, in view of the teachings contained herein, that various alterations, modifications, and improvements not specifically described are available and within the scope of the present invention. Such alterations, modifications, and improvements, as are made obvious by this disclosure, are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for suppressing an electric arc or corona discharge comprising:

providing a device capable of storing, transmitting, or generating an electrical current or field; and enveloping at least a portion of said device with a dielectric gas consisting essentially of an azeotrope-like composition, the an azeotrope-like composition consisting essentially of from greater than about 0 to about 55 weight percent sulfur hexafluoride, from about 45 to less than about 100 weight percent nitrous oxide, and at least one additive selected from the group consisting of stabilizers, metal passivators, corrosion inhibitors, and lubricants.

2. The method of claim 1, wherein the azeotrope-like composition consists essentially of from greater than about 0 to about 54.9 weight percent sulfur hexafluoride, and from about 45.1 to less than about 100 weight percent nitrous oxide.

3. The method of claim 2, wherein the azeotrope-like composition consists essentially of from greater than about 33 to about 34 weight percent sulfur hexafluoride, and from about 66 to less than about 67 weight percent nitrous oxide.

* * * * *